Figure 1:
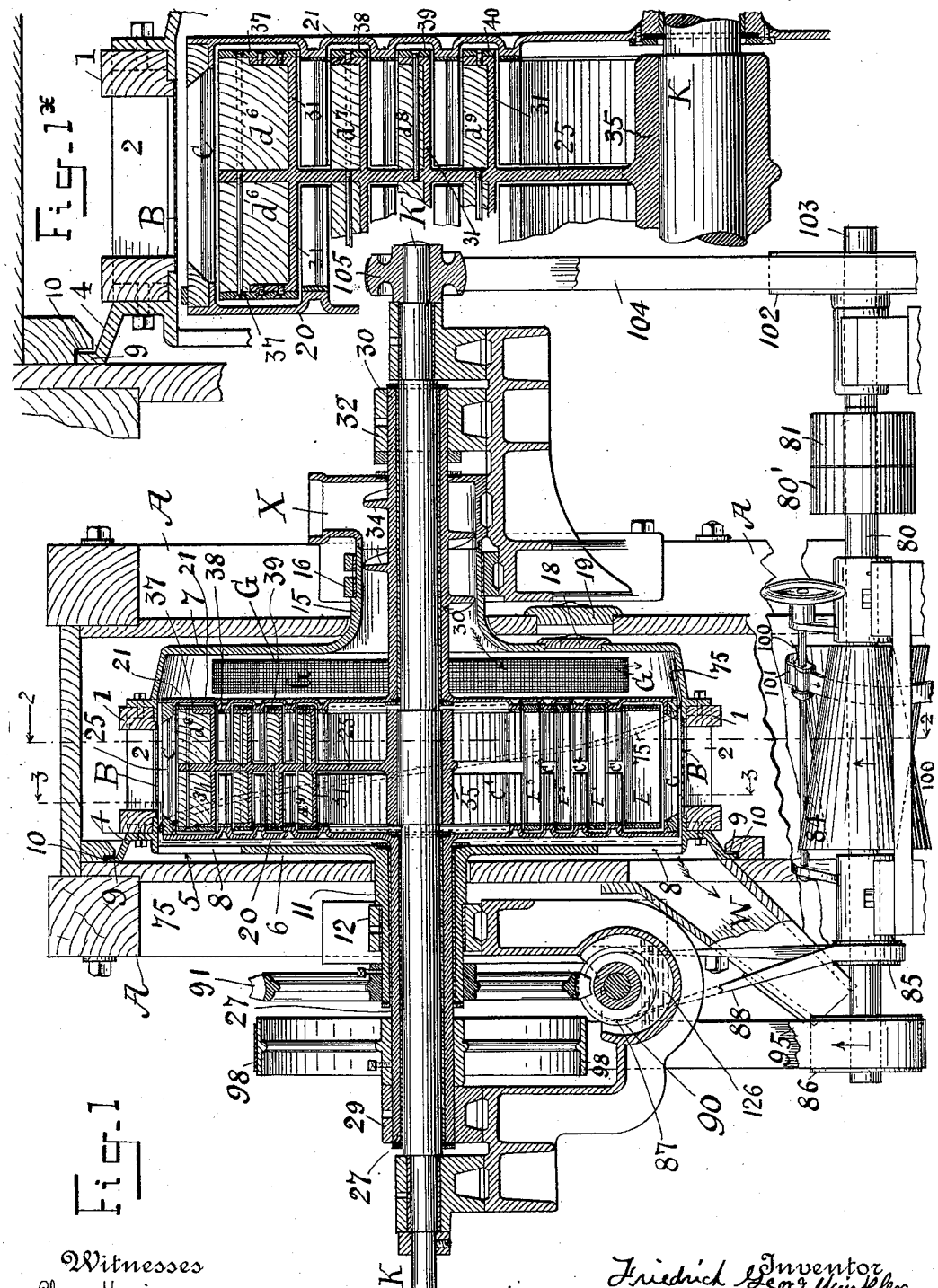

(No Model.)
8 Sheets—Sheet 1.

F. G. WINKLER.
MACHINE FOR SIFTING GRANULAR MATERIALS.

No. 593,915.
Patented Nov. 16, 1897.

Witnesses
Chas. Hanimann
Henry V. Brown.

Inventor
Friedrich Georg Winkler
By his Attorney
D. Walter Brown (No Model.) 8 Sheets—Sheet 2.
F. G. WINKLER.
MACHINE FOR SIFTING GRANULAR MATERIALS.

No. 593,915. Patented Nov. 16, 1897.

Witnesses
Chas. Hanimann
Henry Brown.

Friedrich George Winkler Inventor
By his Attorney
D. Walter Brown (No Model.)   F. G. WINKLER.   8 Sheets—Sheet 3.
MACHINE FOR SIFTING GRANULAR MATERIALS.

No. 593,915.   Patented Nov. 16, 1897.

(No Model.) 8 Sheets—Sheet 4.
F. G. WINKLER.
MACHINE FOR SIFTING GRANULAR MATERIALS.
No. 593,915. Patented Nov. 16, 1897.
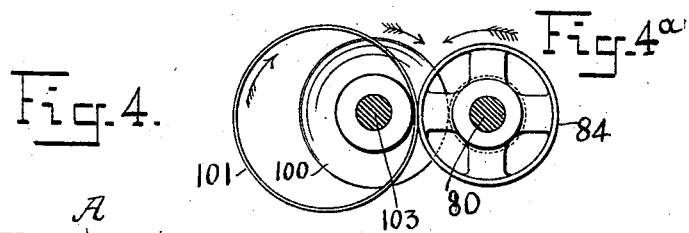
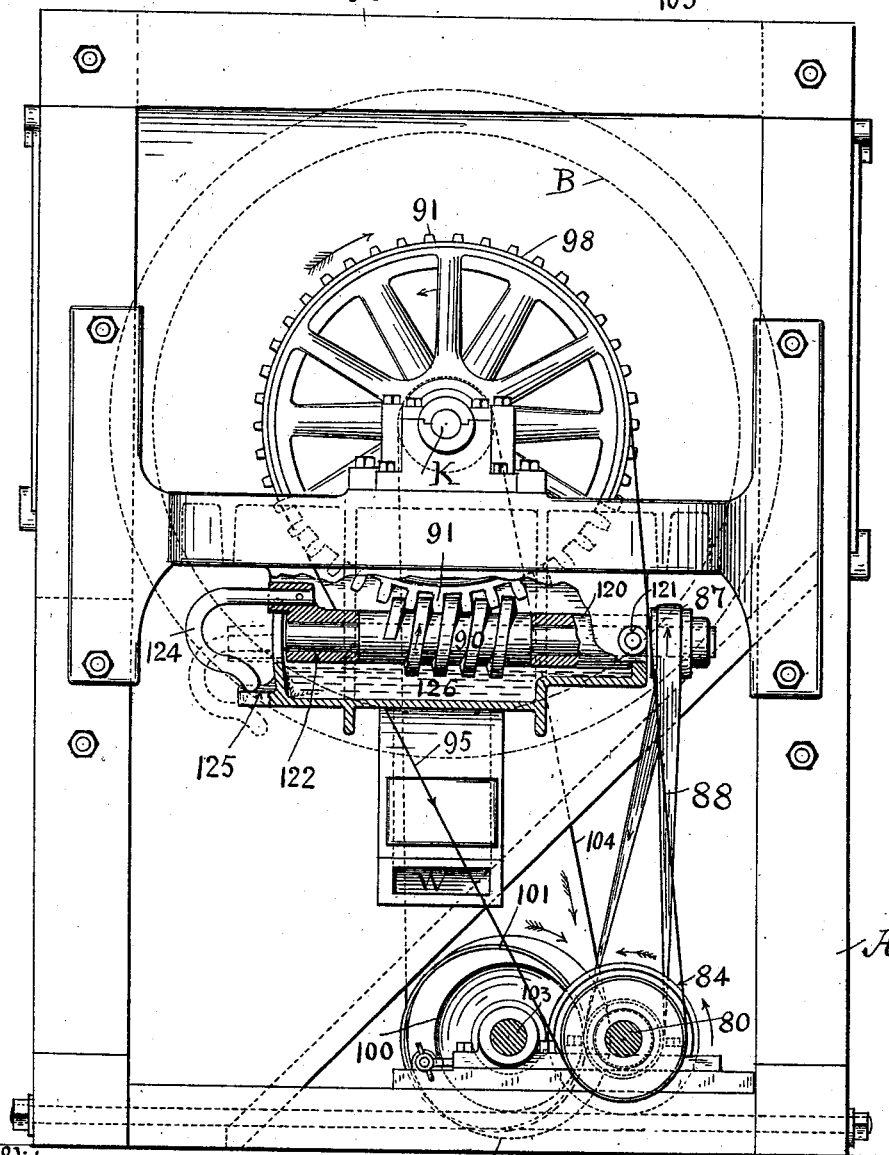

(No Model.) 8 Sheets—Sheet 5.
F. G. WINKLER.
MACHINE FOR SIFTING GRANULAR MATERIALS.

No. 593,915. Patented Nov. 16, 1897.

Witnesses
Chas. Hammann.
Henry T. Brown.

Inventor
Friedrich Georg Winkler
By his Attorney
D. Walter Brown (No Model.) 8 Sheets—Sheet 8.
F. G. WINKLER.
MACHINE FOR SIFTING GRANULAR MATERIALS.

No. 593,915. Patented Nov. 16, 1897.

UNITED STATES PATENT OFFICE.

FRIEDRICH GEORG WINKLER, OF JERSEY CITY, NEW JERSEY.

MACHINE FOR SIFTING GRANULAR MATERIALS.

SPECIFICATION forming part of Letters Patent No. 593,915, dated November 16, 1897.

Application filed August 25, 1896. Serial No. 603,906. (No model.)

*To all whom it may concern:*

Be it known that I, FRIEDRICH GEORG WINKLER, a subject of the Emperor of Germany, and a resident of Jersey City, Hudson county, State of New Jersey, have invented certain new and useful Improvements in Machines for Sifting Granular Materials, of which the following is a specification.

This invention relates to machines for sifting granular materials—such as flour, meal, and other granular substances—through a sieve, and particularly it relates to a machine for operating the process of sifting described and claimed in my application filed in the United States Patent Office the 14th day of August, 1896, Serial No. 602,371. Said process consists, essentially, in subjecting material to the action of a strong long-continued inward current of air by which the inner surface of the sieve is cleared of adhering particles and a large quantity of air is brought into the machine; in almost immediately following this inward current by a strong, swift, and sudden outward sifting-blast by which the finer particles of the material are sifted through the sieve, and following this sifting-blast by (or continuing it into) a long and strong outward after current which blows the sifted particles so far from the sieve that they cannot be caught and brought back by the next inward current.

The machine which is the subject of this application contains, essentially, a sieve; a plurality of concentric gratings, the outer one of which revolves within the sieve with sufficient intermediate space to admit and carry along the necessary supply of material to be sifted; a plurality of fans and a plurality of independent vacuum-generators arranged one within the other, so that the vacuums are developed in any succession determined upon and are regulated to maintain the inward current practically up to the instant when the sifting-blast begins. The said machine is also so constructed that there are open spaces in the interior thereof which are connected laterally, so that the total volume of air brought into the machine by the aforesaid inward current has sufficient room without generating return currents, which greatly reduce the volume of air brought in and impair the efficiency of the machine. Further, the gratings, fans, and vacuum-generating devices (which latter I hereinafter term "suction-blocks") are so combined together that the inner suction-blocks and gratings successively act upon and maintain or even increase the main inward current of air almost up to the instant when the next pressure blade or fan generates the next swift, strong, and sudden sifting-blast. The strength and velocity of this blast are greatly increased by the movement in opposite directions of the inner gratings and fans and especially by the construction and disposition of the machine, so that a part of said inward current rebounds or deflects outward with immense velocity and powerful sifting effect. The fans are also so shaped and disposed as to provide the freest flow possible for the air and interpose the least possible resistance thereto, and the air encounters practically no resistance until it is on the fans. The machine is so arranged that the devices for generating the outward after-current take their air from the said inward current, thereby preventing the crowding of the incoming air and aiding to maintain the said inward current. The air which passes from the inward to the outward after-current is made to sweep under the inner surfaces of the fans, and thus cleans the said surfaces and prevents the accumulation of fine particles in the interior of the machine.

Figure 2:
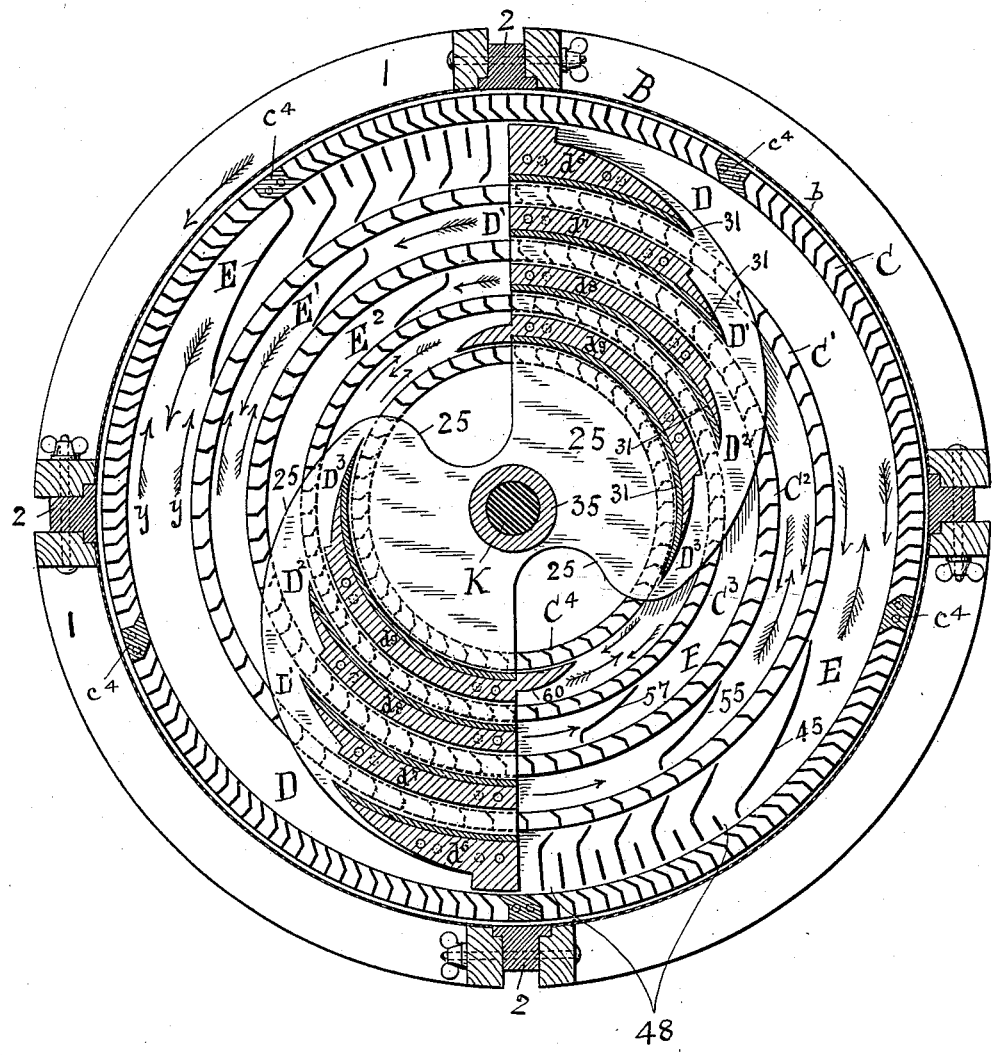
Figure 3:
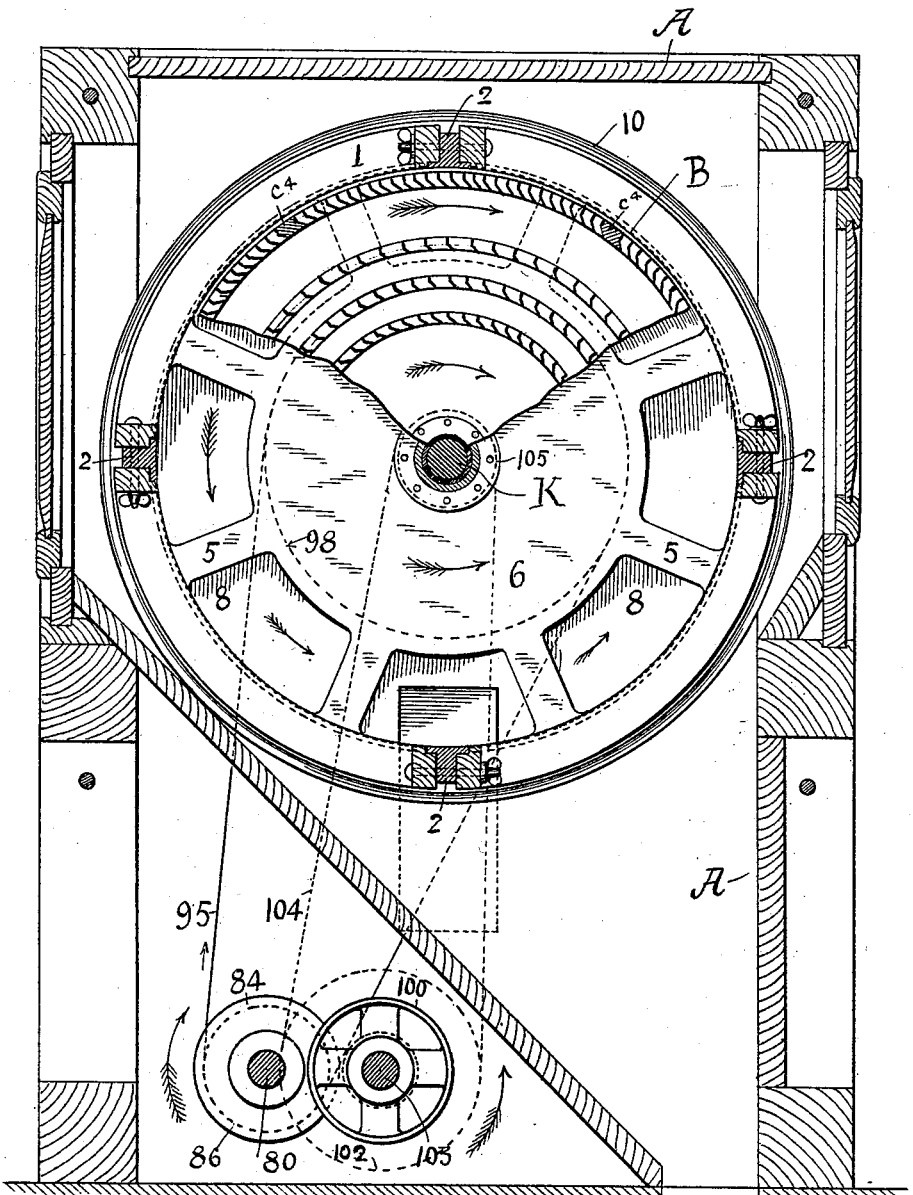
Figure 5:
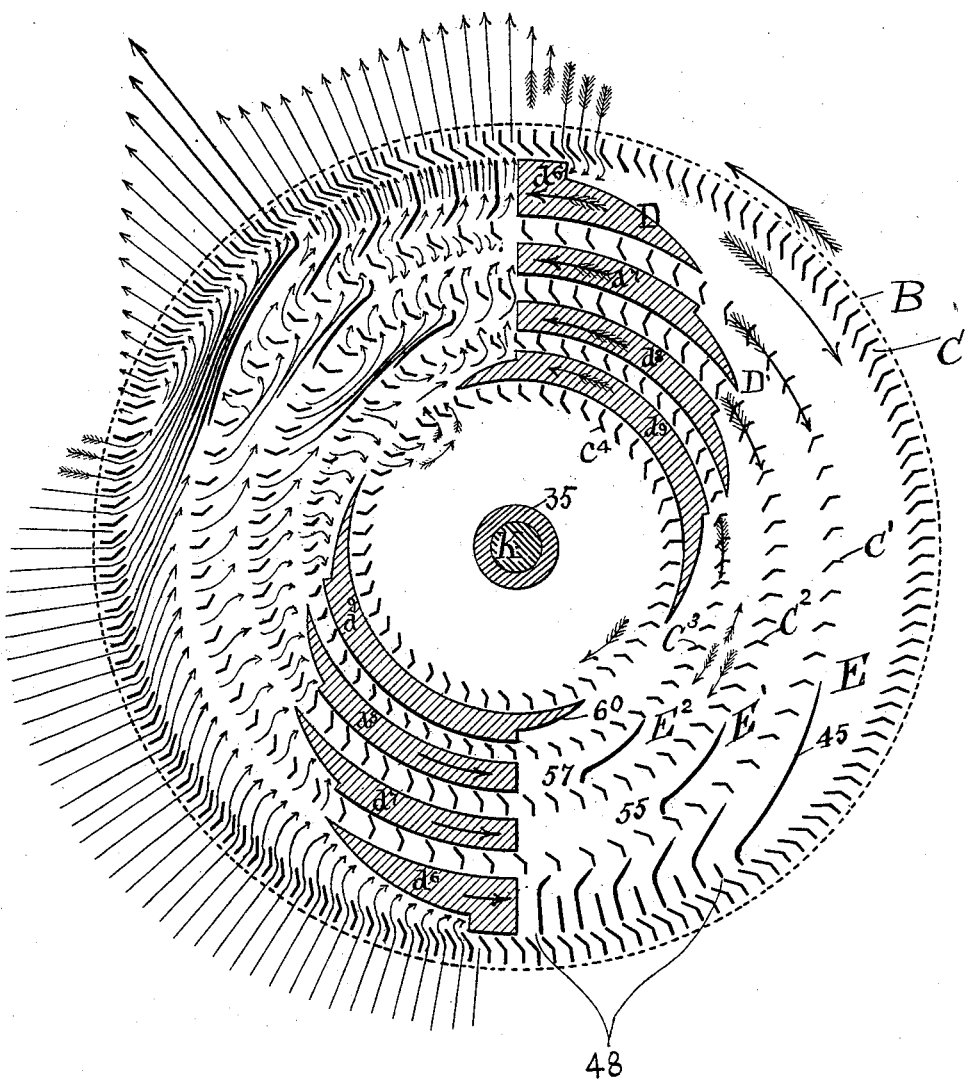
Figure 6:
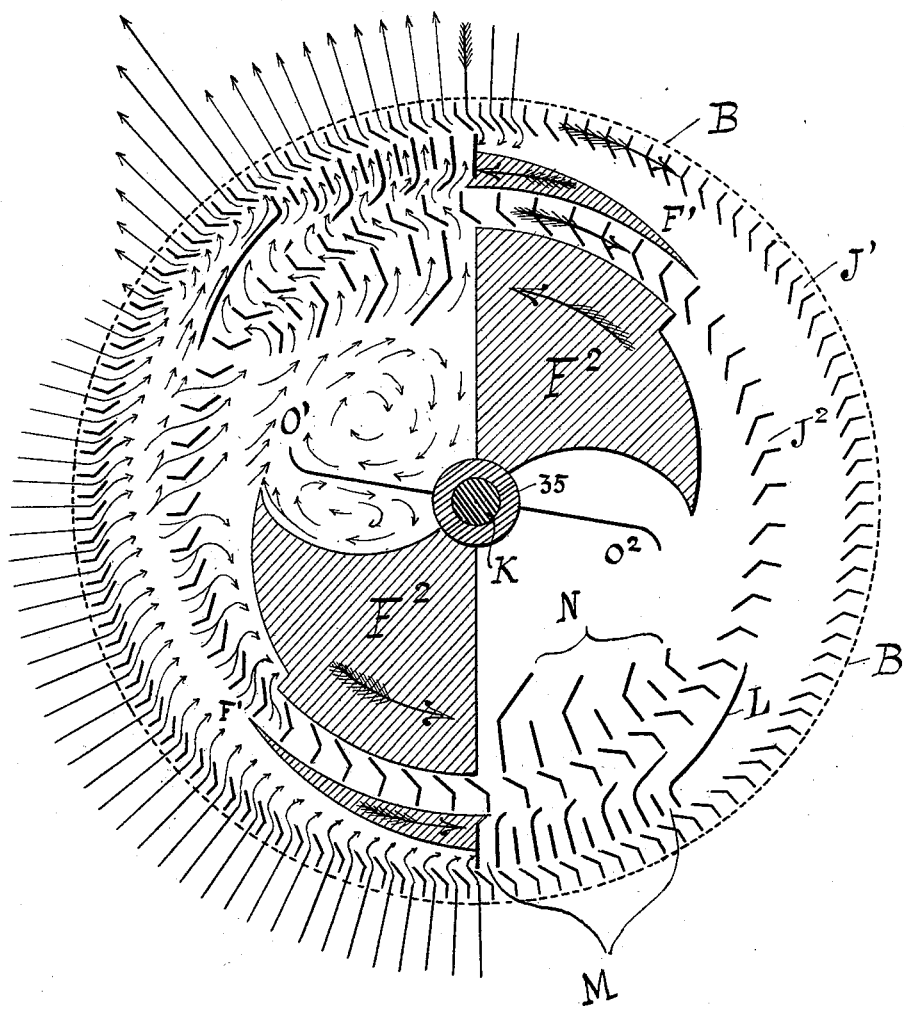
Figure 7:
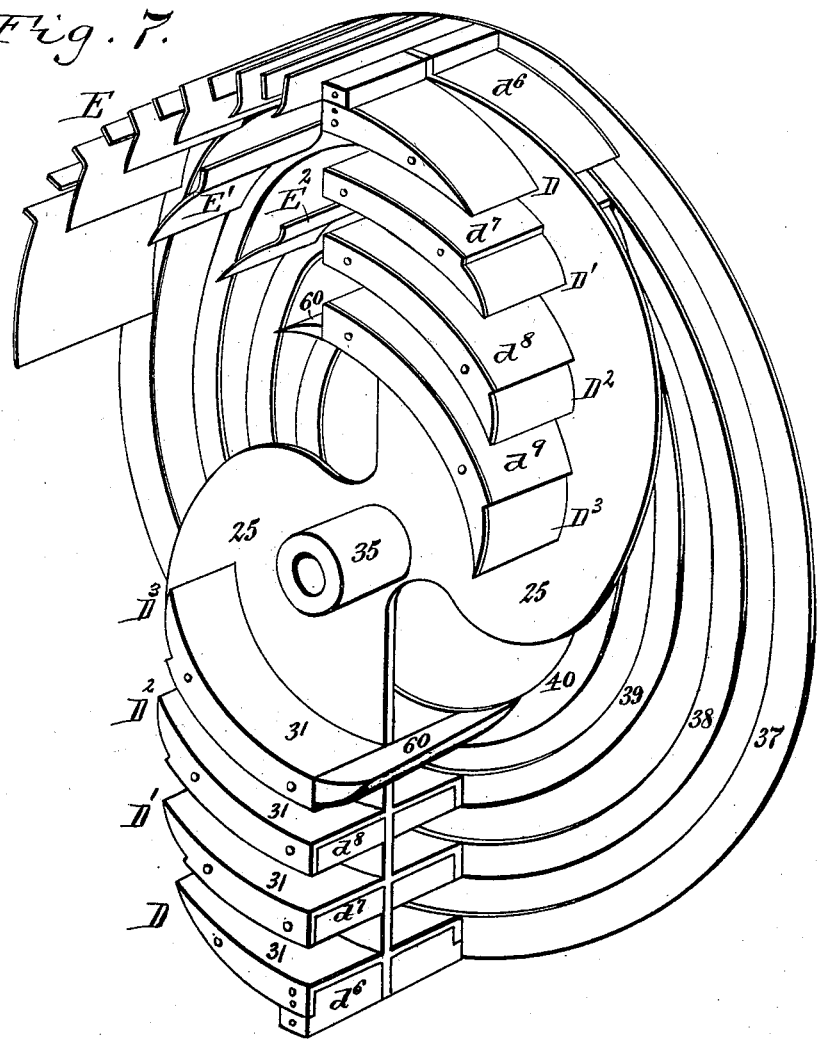
Figure 8:
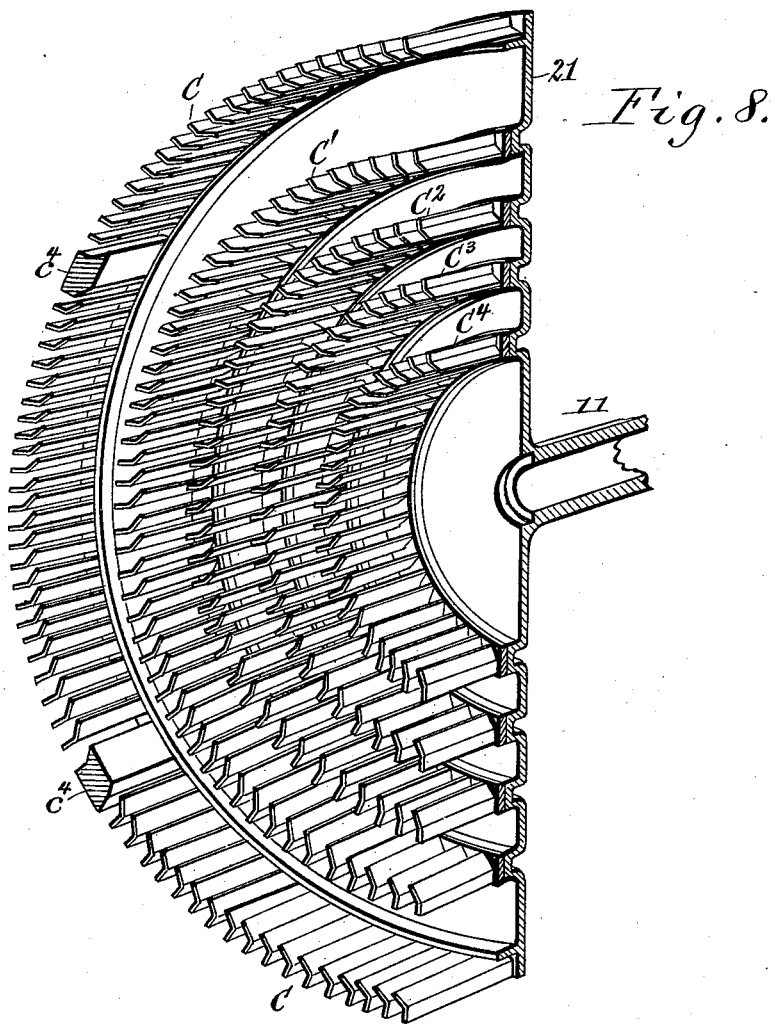

Referring to the drawings which accompany the specification to aid in explaining the invention, Figure 1 is a longitudinal vertical section of the preferred form of the machine. Fig. 1$^\times$ is a detail on a large scale, showing the preferred construction of the pulsators. Fig. 2 is a vertical cross-section on a larger scale and on the line 2 2 of Fig. 1. Fig. 3 is a vertical cross-section, partly broken, on the line 3 3 of Fig. 1 and on the scale of Fig. 2. Fig. 4 is an elevation of the left end of Fig. 1. Fig. 4$^a$ is a detail of the preferred device for driving the "pulsator." Fig. 5 is a sectional diagram on a large scale, showing the preferred shape and relative positions of the gratings, suction-blocks, and fans. This figure illustrates parts of the same machine that is shown in Fig. 1. Fig. 6 is a cross-sectional view illustrating modifications in the arrangement of gratings, suction-blocks, and fans. Fig. 7 is a fragmentary perspective view of the wing-plate shown in Fig. 1ˣ. Fig. 8 is a fragmentary perspective view of one of the heads with its plurality of concentric gratings shown in Fig. 1ˣ.

Referring to Figs. 1 to 5, inclusive, A is the bolting-chest, within which are arranged the sieve B, the concentric gratings C C' C² C³ C⁴, suction-blocks $d^6$ $d^7$ $d^8$ $d^9$, and the fans E E' E². Said sieve B may either revolve or be stationary. The said gratings preferably revolve in the direction of the arrow $y$, Fig. 2—i. e., in the direction opposite to the revolution of the sieve B, if said sieve revolves—and the said suction-blocks and fans (which taken together I term the "pulsators," since they produce the pulsations of the air which are instrumental in developing the currents and distribution of the volumes of air through the machine, whereby the working of the process is effected) revolve at comparatively high velocities in the direction preferably opposite to the revolution of the gratings. Said sieve B is a cylindrical reel having its peripheral wall formed of a suitable screen or bolting-cloth $b$, stretched in any known and usual manner on frames 1 2, Fig. 2. At one end the said frames are fastened to rims 4, Fig. 1, carried on the ends of radial arms 5 5 of a circular head 6, and the other end of said frames is fastened to a circular head 7, which is bent and flanged at its outer part, as shown in Fig. 1. Openings 8 8 between said arms 5 5 permit the tailings to pass out to the discharge-chute W. A flanged rim 9 on said head 6 revolves with dust-tight fit in a circular groove 10, formed in the frame in the usual manner, and said head 6 carries a hollow hub 11, which turns in boxes 12, carried by the frame. The hollow hub 15 of the head 7, and which is of sufficient diameter to serve as the inlet for the materials to be separated, turns in boxes 16 and makes a close working joint with the end of the feed-chute X.

G is a wire-mesh cylindrical basket carried by and revolving with said head 7. All the said materials are required to pass through said basket, and any article or thing that is too coarse for the mesh of the basket will be retained thereby. Removable plugs 18 19 are provided to give access to said basket. This basket also operates to check the pulsations of the air near the delivery end of the feed-spout. When these pulsations extend into the feed-spout with full force, they retard the feed and blow out of the feed-spout more or less of the fine material. The arrangement of a screen between the feed-spout and the pulsator or device which produces the air pulsations overcomes this difficulty.

The aforesaid gratings are preferably arranged in concentric circles C C' C² C³ C⁴, as shown in Fig. 5. The grates or bars of each circle are arranged in two parts or halves, one part being fastened to the head 20 and the other part to the head 21, and, if desired, the number and shape of the bars in one part may differ from those in the other part. The bars of the outer circle C are each preferably bent, as shown in cross-section, Fig. 5, to give the air-currents a direction approximately radially outward, and the bars of the inner circles of gratings C' C² C³ C⁴ may be either similarly bent or curved or be flat. The bars of said inner circles C' C² C³ C⁴ extend from their respective heads 20 or 21 nearly to the middle of the machine, but sufficient space is left between the inner ends of said bars to permit of the free revolution of the wings 25 25, which carry the suction-blocks and fans, Fig. 2. The bars of the outer circle of deflecting-grate C, however, extend entirely across from the head 20 to the head 21, and said bars are preferably held in frames secured on said heads, as indicated in Fig. 1.

In the machine illustrated in the drawings all the gratings are driven from the same shaft or hub, but each circle of gratings may, if desired, be constructed so as to be driven independently of all the others.

Referring to Fig. 1, the hollow hub 27 on head 20 passes through hollow hub 11 and turns in boxes 29, and the hollow hub 30 of head 21 passes through hollow hub 15, there being a good space between said hubs 30 and 15, and turns in boxes 32. A spiral conveyer 34 on hub 30 works the materials toward and into the aforesaid basket G. The machine can of course be so constructed that the pulsators may be driven from a hollow hub, and one or more of the circles of gratings may be driven from the central shaft. For strength I prefer to connect the heads 20 21 by braces $c^4$, arranged at suitable intervals.

The aforesaid suction-generators D D' D² D³ are preferably formed as blocks $d^6$ $d^7$ $d^8$ $d^9$, which I term "suction-blocks" and which are preferably curved on their rear or suction side, as shown in Fig. 5. The innermost block $d^9$ is preferably extended backwardly until its rear corner is under the forward end of fan E, Fig. 5. Said suction-blocks $d^6$ $d^7$ $d^8$ $d^9$ are arranged and fastened in the following manner on the wings 25 25, which are fixed on the sleeve 35, that is keyed to the swift-running shaft K: Said wings 25 25 are provided with transverse arms 31, flanged at their outer ends, as shown. On said arms 31 are fastened the concentric rings 37, 38, 39, and 40. Said suction-blocks $d^6$ $d^7$ $d^8$ $d^9$ are each made in halves, and said halves are fastened at opposite sides of said wings 25 25, respectively, between said wings and the aforesaid rings 37, 38, 39, and 40. Thus the several circles of gratings are arranged and revolve between adjacent and alternate circles of suction-blocks and the several circles of suction-blocks are arranged and revolve between alternate circles of gratings. (Compare Figs. 1ˣ and 5.)

The aforesaid pressure-fans E E' E² are fastened to their respective rings 37 38 39. The outer fans E consist of main blades 45 45, which generate the swift, strong, and sudden sifting impulse, in combination with the outer deflecting-grate C, and said main fan-blades are bent forward at a considerable angle from the radius to effect the powerful outward rebound of the air-currents, which is a very important factor in generating the desired sudden and powerful outward impulse of the sifting-current, as hereinbefore mentioned. Each of the said main blades 45 is followed by a group of auxiliary fan-blades, certain of which are preferably bent forward at a less angle than the main fan-blades 45. The number of said auxiliary blades 48 may be increased or diminished according to circumstances, and said auxiliary blades are disposed between the main fans 45 and the advancing side of the suction-blocks $d^6$. The purpose of said auxiliary blades 48 is to take up the air furnished by the inner fan-blades 55 57 and the front curve 60 of the suction-block $d^9$ and deliver it in a strong outward after-current of large volume between said main fan 45 and the advancing face of said suction-block $d^6$. Said inner fan-blades 55 57 and curve 60 may be either used singly, as shown, or be followed, or even replaced, by groups of fan-blades, or for certain purposes entirely omitted. The air delivered by said fan-blades 55 57 and curved surface 60 to the auxiliary fan-blades 48 and by said fan-blades 48 sent through the sieve as a strong outward after-current of large volume blows the material which has been sifted by the main outward sifting-current, which was developed by the main fan-blades 45, so far from the sieve that it cannot be caught and brought back by the next inward current. Said fan-blades 55 57 and curved surface 60 (or their corresponding groups of fan-blades) are so shaped and disposed in the machine as to provide the largest possible area for the outflowing air and to offer the least possible resistance thereto. Therefore, as will be observed on inspection of the drawings, the passages between the fan-blades preferably enlarge in the direction of the air flow, and in this manner not only does a large volume of air pass to the point of discharge of and form the outward after-current, but said air also powerfully sweeps the under sides of the fan-blades and prevents the accumulation of fine particles of the material in the interior of the machine.

In Fig. 6 I employ only two suction-blocks F' F², preferably shaped as shown, and only two gratings J' J². L is the main fan to generate the sifting impulse, M the auxiliary fans to generate the outward after-current, and N inner blades which coöperate with the grating J² to deliver the air to said auxiliary fans M. O' O² are auxiliary suction-blades fixed on the heads which carry the blocks F' F². The air-currents generated by this machine agree in their general character with those generated by the machine illustrated in Figs. 1 to 5 and operate the same process of sifting.

Figs. 5 and 6 both show lateral passages between the suction-blocks, which passages establish communication between the pressure and suction sides of the machine and greatly increase the efficiency thereof. Said passages in sifting-machines of the wave-generator type are new in the art and are rendered practicable only by the different construction and mode of operation of my new machine. Such passages in the wave-generators heretofore known would be destructive of the efficiency of the machine, and therefore all such older machines were so constructed as to be provided with cells closed toward the center and open only at the periphery. In the preferred form of my new machine illustrated in Fig. 5 I have not only employed said lateral passages, but have in addition opened the center of the machine inside of the innermost circle of gratings $c^4$, and this central space or chamber is connected on opposite sides with the air-spaces in the outer parts of the machine, so that there can be a free movement of air through the center. A very effective machine is produced by this form of construction.

As I have explained in another application, the efficient practical working of the machine is promoted by providing for varying the velocity of the pulsators while the machine is running and independently of any variation in the velocity of the gratings or the sieve, if the sieve revolves. Therefore I show suitable driving-gear for this purpose in connection with this application, but reserve my claims for the same to said other application, filed August 26, 1896, Serial No. 604,038. Said driving-gear is preferably constructed as follows: A shaft 80, provided in the usual manner with fast and loose driven pulleys 80' 81, respectively, carries a cone 84 and driving-pulleys 85 86. A half-turn belt 88 from said pulley 85 drives a worm 90, which meshes with a worm-gear 91 of the sieve B, thereby imparting a slow rotation to said sieve. A belt 95 from pulley 86 drives a pulley 98, fixed on the hub 27 of the gratings. A cone 100 is driven from cone 84 through the medium of the shiftable endless belt 101, which is equipped with any suitable belt-shipper, and a pulley 102, fixed on the shaft 103 of said cone 100, drives pulley 105 on the aforesaid swift-running shaft K, on which are fixed, as hereinbefore described, the pulsators, (fans and vacuum-generators.) Thus by shifting belt 101 the speed of said fans and vacuum-generators may be varied according to the nature of the material, without varying the speed of the sieve or the gratings.

The machine operates as follows: The material to be sifted having been fed through the chute X, works into the basket G, and falling from thence is worked by the spiral blade 75 into the annular space between the deflecting-grates and sieve. Now the long and strong inward air-current clears the sieve of adhering particles of the material and brings a large volume of air into the machine. A certain proportion of this air is crowded upon and rebounds powerfully outward from the main fan-blades 45, developing a very strong, swift, and sudden outward current, which sifts the finer particles of the material through the sieves. The remaining part of the in-brought air flows freely into the interior of the machine, as described, and to the auxiliary fans 48, between the said main sifting-fans 45 and the front side of suction-blocks $d^6$, and is here expelled as a long and strong outward after-current, blowing the sifted particles far from the sieve. Then follows the next inward current, and so the cycle repeats itself continuously all around the sieve. The aforesaid wings 25 can be replaced by plates to carry the gratings, while the fans and suction-blocks can be arranged on the heads 20 21. In this case said heads will have the more rapid motion. Fig. 4 illustrates an arrangement for disconnecting said worm 90 from worm-gear 91, so that the sieve B can be stopped or turned by hand for cleaning and other purposes. The box 120, in which said worm 90 is journaled, is pivoted at 121 near pulley 87. The other box 122 is normally sustained in proper position for meshing worm 90 with worm-gear 91 by a hook 124, which is capable of a slight rotation in box 122 and which normally rests on the slightly-concave surface of a bracket 125. To disconnect the worm 80, hook 124 is turned off bracket 125 and the worm lowered to the position of the dotted lines. Pulley 87 is made sufficiently broad that belt 88 shall not be unshipped, and an oil-chamber 126 may be formed in the frame under the worm. The number of pulsators on each ring may be only one or may be any greater number, as desired to increase the number of air-waves around the circumference for special purposes. The drawings show throughout only two pulsators on each ring for convenient construction.

I do not claim in this application any invention or improvement which is claimed in my aforesaid application for patent or in my applications filed August 26, 1896, Serial No. 604,038, and August 27, 1896, Serial No. 604,134.

The grate which is arranged inside of the path of the blast-fan and suction-block shifts the air in a direction opposite to that in which these parts rotate—that is to say, it moves the air from the suction-space in advance of the blast-fan or blast-generator to the blast-space adjacent to the same, and this is true whether the grate rotates in a direction contrary to that of the blast and vacuum generator, as shown, or whether it rotates in the same direction but at less speed, or whether it is stationary. This shifting of the air inside of the path of the blast and vacuum generator in a direction contrary to that in which these devices rotate prevents the formation of undercurrents in the suction or vacuum space. It also prevents the air from rotating with the speed of the pressure fan or fans inside of the path of the latter and it increases the blast effect.

Now, having described my improvements, I claim as my invention—

1. The combination in a machine for sifting granular materials, of a cylindrical sieve, a rotatable fan or fans therein adapted to generate a main sifting-current and an outward after-current through the sieve, and a plurality of rotatable vacuum-generators within said sieve adapted to successively generate vacuums within the sieve whereby a large volume of air is brought in to supply the blasts, substantially as described.

2. The combination in a machine for sifting granular materials, of a cylindrical sieve, a main rotatable fan or fans therein, adapted to generate a sifting-current, and a plurality of rotatable concentric auxiliary fans and gratings within said sieve, adapted to generate successive vacuums within the sieve for drawing a large volume of air therein, and also to generate an outward after-current following the aforesaid sifting-current, substantially as and for the purpose described.

3. The combination in a machine for sifting granular materials, of a cylindrical sieve, and a chamber therein, a plurality of rotatable pressure-fans and vacuum-generators in said chamber and passages through or between said fans and vacuum-generators for the flow of air through said chamber and to the points of discharge both of the sifting and outward after-current, substantially as described.

4. The combination in a sifting-machine, of a cylindrical sieve, heads carrying a plurality of concentric gratings which project inwardly from said heads, a wing-plate adapted to rotate independently of said heads, and fans on said wing-plate projecting outwardly therefrom in the spaces between said concentric gratings, and means for independently revolving said heads and said wing-plate, substantially as described.

5. In a sifting-machine, the combination of a rotary sieve, a rotary plate adapted to carry gratings which project from the sides of the plate, a head rotating independently of said plate, fans projecting from said head into the intervals between said gratings, and means for independently rotating said sieve, head and plate, substantially as set forth.

6. In a sifting-machine, the combination with an inclosing sieve, a rotary pulsator arranged within said sieve and producing blast and suction pulsations of the air within said sieve, and the feed-spout through which the material to be separated enters said sieve, of a screen which is interposed between said feed-spout and said pulsator and whereby the air pulsations are checked before reaching the feed-spout, substantially as set forth.

7. In a sifting-machine, the combination with an inclosing sieve, of a rotary blast and vacuum generator arranged within said sieve, and an air-shifting device arranged inside of the path of said blast and vacuum generator and mounted independently of the same, substantially as set forth.

8. In a sifting-machine, the combination with an inclosing sieve, of a rotary blast and vacuum generator arranged within said sieve, and an air-shifting device arranged inside of the path of said blast and vacuum generator and operating to shift the air in a direction contrary to that in which the blast and vacuum generator rotates, substantially as set forth.

9. In a sifting-machine, the combination with an inclosing sieve, of a rotary blast and vacuum generator arranged within said sieve, and an air-shifting device arranged inside of the path of said blast and vacuum generator and rotating in an opposite direction, substantially as set forth.

10. The combination in machines for sifting granular materials of a cylindrical sieve, a rotatable deflecting-grate within and adjacent to the sieve, a rotatable suction block or blocks and fan or fans within said deflecting-grate, a rotatable grating within said suction-block or suction-blocks and said fan or fans, and an air-chamber in the center of the machine, substantially as and for the purpose described.

11. The combination in a sifting-machine, of a sieve, a rotatable deflecting-grate within said sieve, rotatable suction-block or suction-blocks and rotatable main fan or fans within said grate, and rotatable auxiliary fan or fans behind said main fan or fans and between the same and said suction block or blocks, substantially as set forth.

In testimony that I claim the foregoing as my invention I have signed my name, in presence of two witnesses, this 12th day of August, 1896.

FRIEDRICH GEORG WINKLER.

Witnesses:
BERNARD J. ISECKE,
HENRY V. BROWN.